COHERENT RECOVERY OF PHASE-MODULATED DIBITS

Filed Sept. 3, 1963

2 Sheets-Sheet 1

FIG. I

INVENTOR.

ADAM LENDER

BY

Lippincott, Ralls & Hendricson

ATTORNEYS

Feb. 27, 1968 A. LENDER 3,371,279

COHERENT RECOVERY OF PHASE-MODULATED DIBITS

Filed Sept. 3, 1963 2 Sheets-Sheet 2

INVENTOR.
ADAM LENDER
BY
Lippincott, Ralls & Hendricson
ATTORNEYS 3,371,279
COHERENT RECOVERY OF PHASE-MODULATED DIBITS Adam Lender, Palo Alto, Calif., assignor, by mesne assignments, to Automatic Electric Laboratories, Inc., Northlake, Ill., a corporation of Delaware Filed Sept. 3, 1963, Ser. No. 306,082
8 Claims. (Cl. 325—320)

ABSTRACT OF THE DISCLOSURE

This invention relates to method and apparatus for recovering original binary data from a carrier which has been quaternary phase modulated with the data by converting a frequency component of the carrier obtained from the phase-modulated carrier into two reference carriers having the same frequency as the carrier and differing in phase from the original carrier by an integral number of degrees defined by the relationship $$-135° \pm 90n$$

Figure 1:
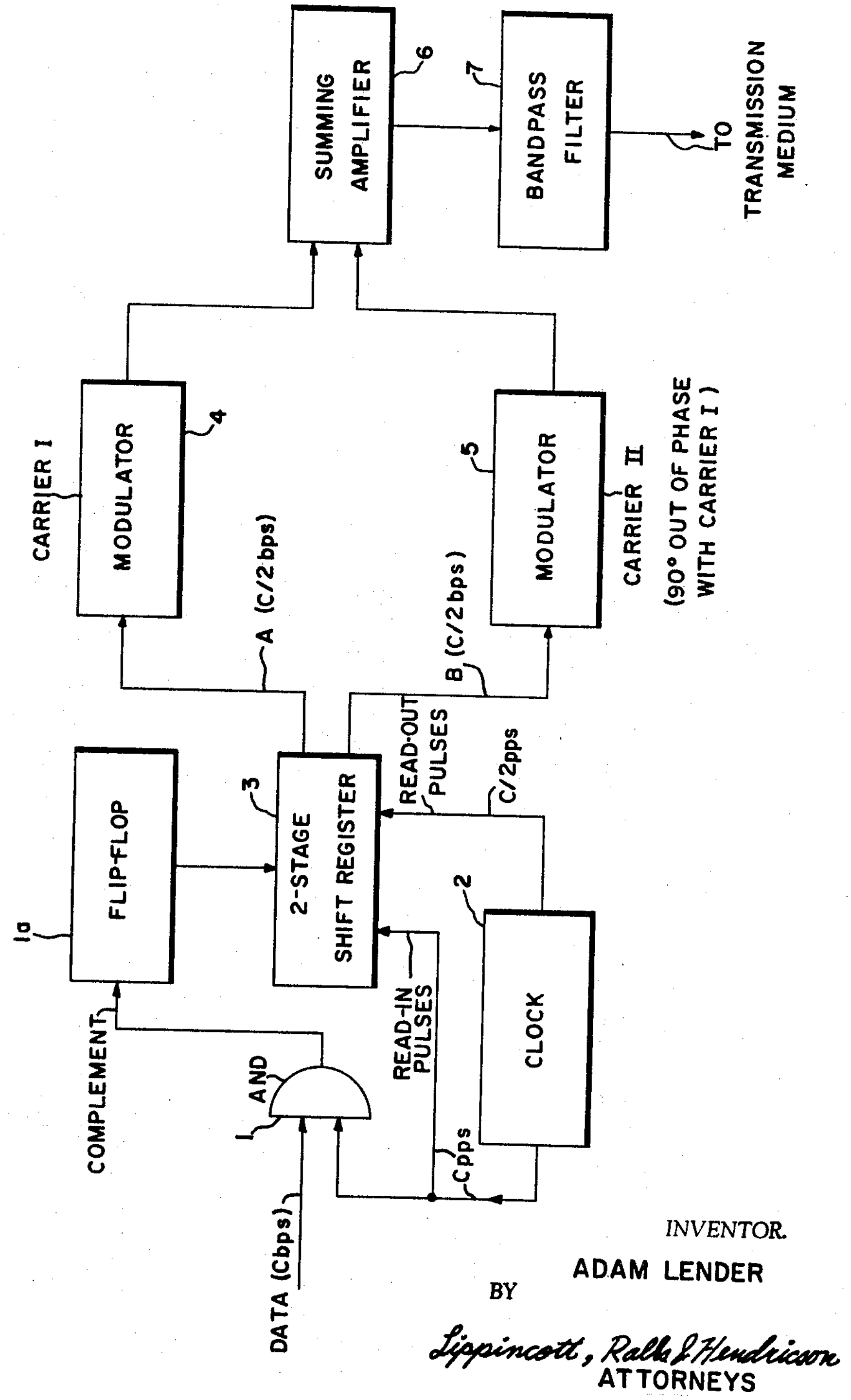

where $n$ may be an integer from 0 to 3, and the second reference carrier is 90° out-of-phase with the first. Each of these reference carriers is multiplied by the quaternary phase-modulated carrier and the two resultant signals are converted to corresponding first and second binary digital signals. Each of these two binary digital signals is delayed by one binary bit to obtain third and fourth binary digital signals, and the four binary digital signals are logically combined to produce a binary output signal corresponding to the original binary data. Coherent recovery of phase-modulated data is herein obtained without the requirement of deriving a separate synchronous demodulating signal.

This invention relates to a method and apparatus for recovering data from a carrier which has been quaternary phase-modulated with the data. More specifically, the invention uses digital techniques on the phase-modulated carrier which result in the unambiguous reconstruction of the original data at the receiver.

Of the many modulation methods now available, phase modulation is preferred for some data applications because of its superior performance as measured by the rate of information transmission per unit of bandwidth. Moreover, phase-modulated carriers are sometimes less affected by certain types of noise than other methods. There are two well known systems of phase modulation: the first uses an absolute reference carrier, and the second uses a relative reference carrier in the form of the previous data digit. The second method is called "differentially coherent" phase modulation.

The first system, using an absolute reference carrier, has the disadvantage resulting from the difficulty of maintaining a reliable absolute reference in view of bursts, impulse noise, transmission breaks, and frequency shifts often encountered in transmission, such as over telephone lines. Any resulting phase errors may lead to ambiguous recovery of data.

The differentially coherent method requires the storage of the previous data digit. This is conventionally done in an analog manner. Such storage may use a mechanical resonator or a passive LC delay line. A mechanical resonator is extremely complex, and is generally considered to augment the cost of the system beyond practical limits. A delay line must meet strict requirements of flat attenuation and delay characteristics within the significant frequency band occupied by the modulated data. However, in the case of voice band transmission, such characteristics comprise about three octaves. As a result, the required delay line is bulky and its characteristics are generally not sufficiently flat over the entire band. Consequently, additional distortion is incorporated into the reference. Moreover, some flat loss is usually introduced by the delay line, requiring additional amplification. Finally, the reference digit emerging from the delay line is often contaminated by noise and may be considerably distorted due to transmission medium characteristics. This invention employs a digital detection method and apparatus which, while using a differentially coherent data system, eliminates the disadvantages encountered above when analog decoding techniques are used. In this invention, "clean" digital reference digits rather than "noisy" analog reference digits are obtained. Bulky delay lines are eliminated, along with their concomitant flat losses. The digital apparatus employed, such as flip-flops and gates, are "yes-no" components, greatly increasing their reliability and ease of maintenance and testing.

Briefly, the apparatus of the invention for recovering the original binary data from a carrier which has been quaternary phase-modulated with the data comprises:

(a) a means for obtaining a frequency component of the carrier from the phase-modulated carrier, (b) a means for converting the component into two reference carriers, each of the same frequency as the carrier, the first of which differs in phase from the carrier by an integral number of degrees obtained from the following formula:

$$-135° \pm 90n$$

where $n$ may be any integer from 0 to 3; and the second reference carrier is 90° out-of-phase with the first;

(c) a means for separately multiplying each of said reference carriers by said quaternary phase-modulated carrier to obtain two binary analog signals;

(d) a means for converting each of said two binary analog signals to corresponding first and second binary digital signals, respectively;

(e) a means for delaying each of said two binary digital signals by one binary bit to obtain a third and a fourth binary digital signal; and (f) a means for logically combining the first, second, third, and fourth binary digital signals so obtained to produce a binary output signal corresponding to said original binary data.

This invention therefore provides all the advantages of quaternary coherent phase modulation, particularly transmission speed, without the disadvantages normally found using analog delay schemes.

Figure 2:
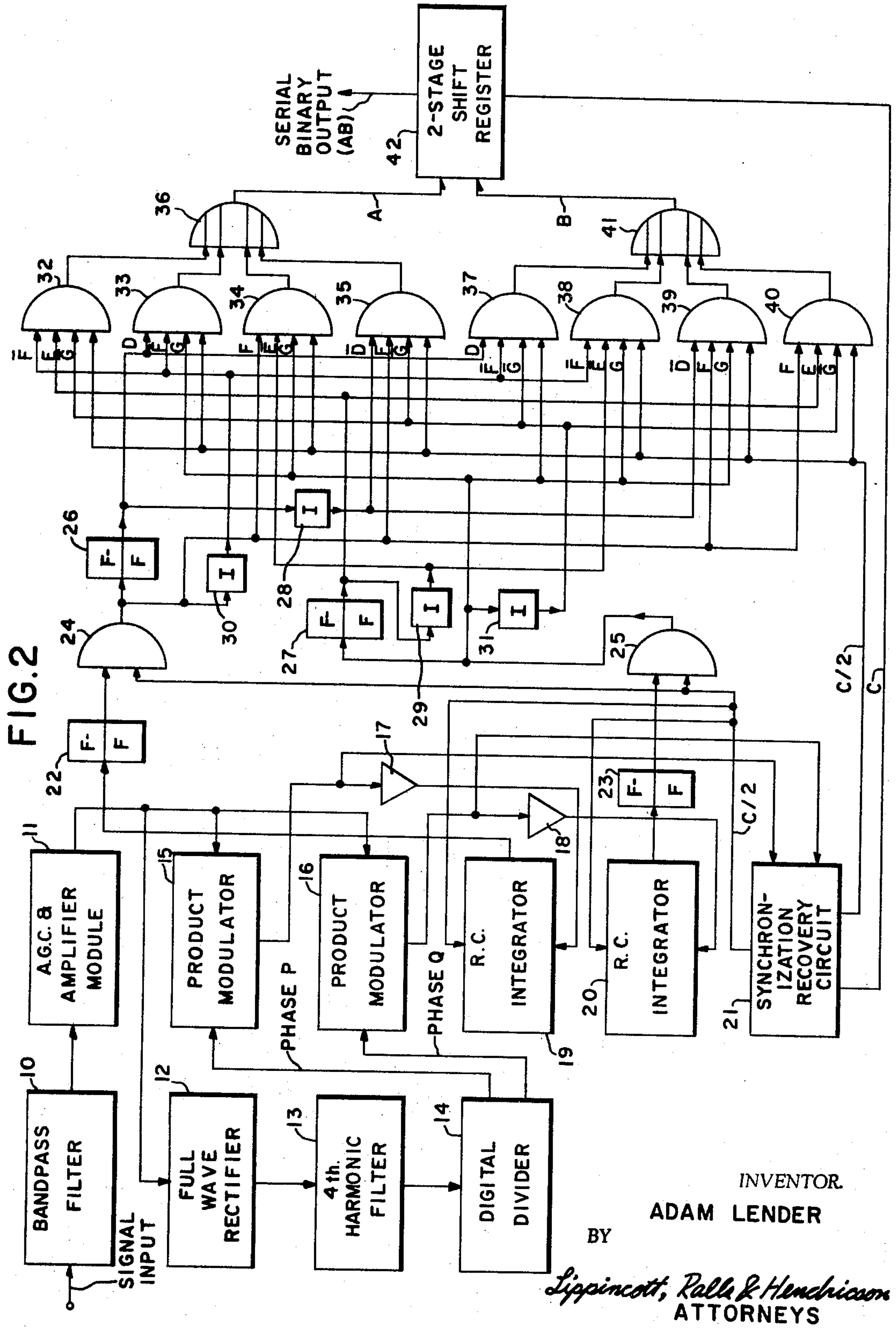

The invention will be more fully understood by reference to the detailed description and drawings which follow. In the drawings:

FIG. 1 is a block diagram of a transmitter which may be used for the transmission and modulation of the data used by the receiver of this invention; and FIG. 2 is a block diagram of the receiver of this invention.

Referring to FIG. 1, a typical transmitter used to send data to the receiver of this invention is shown. Data is to be transmitted at C bits per second (b.p.s.), and to that end the data is gated at C b.p.s. through AND-gate 1 with a conventional two-speed clock pulse generator, or "clock" 2 set to deliver clock pulses at the rate of C and $C/2$ pulses per second (p.p.s.). AND-gate 1 will provide a positive output pulse each time a data pulse enters which is positive. Flip-flop 1*a* will always change state when such an output pulse from AND-gate 1 is present. Arbitrarily, a positive binary input pulse will be termed a binary "MARK." With a binary SPACE, AND-gate 1 will have no positive output pulse and flip-flop 1*a* will remain in its previous state. As a result, the output pulses from flip-flop 1*a* represent the "digital derivative" of the data pulses, or as often termed, the "differential signal." This signal is passed serially to a two-stage shift register 3, a digital device well known in the art. This shift register is connected to the C p.p.s. output of clock 2 to read in the pulses from flip-flop 1$a$ at C b.p.s. The output pulses from shift register 3 are in two parallel channels, A and B, as shown. Each channel is connected to the $C/2$ p.p.s. output of clock 2 so that pulses will be read out at the pulse rate of $C/2$ p.p.s. These two channels are each passed respectively to modulators 4 and 5, where they are phase-modulated with a synchronous carrier. For voice transmission, the carrier is conventionally 1800 cycles per second (c.p.s.). For 48 kc. channel transmission, the carrier is generally 84 kc. The two carriers I and II are 90° out-of-phase with respect to each other. The modulators used are conventional, and need not be described in detail here.

The outputs of the two modulators 4 and 5, because of the 90° relationship between the carriers, are 90° out-of-phase, or as normally described, in "phase quadrature" relationship. These outputs are passed to summing amplifier 6 where they are combined, and then through bandpass filter 7.

The primary function of bandpass filter 7 is the suppression of unwanted harmonics. However, both this filter 7 and the filter in the receiver are designed to eliminate the edges of the transmission band, where the differential delay is greatest.

To summarize, in accordance with the above description, the input to the transmitter is a data pattern at C b.p.s. This is converted into two differential channels, each having a rate of $C/2$ d.p.s. (dibits per second). Denoting the two channels by A and B, the output of the bandpass filter 7 has phase changes.

$$\frac{n\pi}{2}$$

where $n=0, 1, 2, 3$

The absolute phases will be $$\frac{m\pi}{4}$$

where $m=1, 3, 5, 7$.

Table I, below, shows these phase changes in accordance with the rule:

MARK=1=Phase Change
SPACE=0=No Phase Change

TABLE I

| Input Data Pattern of Channels A and B | | Channel Phase Changes | | Transmitter Output Phase Change |
|---|---|---|---|---|
| A | B | A | B | |
| 0 | 0 | 0 | 0 | 0 |
| 0 | 1 | 0 | $\pi$ | $-\pi/2$ |
| 1 | 0 | $\pi$ | 0 | $+\pi/2$ |
| 1 | 1 | $\pi$ | $\pi$ | $\pi$ |

The expression representing the differentially coherent output of the integrators is:

$$M(t)=\int_0^T [A_p \sin (w_c t+\phi_1)][A_r \sin (w_c t-\phi_2)]dt$$

where $T=\frac{K2\pi}{w_c}$=integration time in seconds
$K$=number of cycles per digit
$w_c$=carrier frequency in radians per second
$A_p$=amplitude of present digit
$A_r$=amplitude of reference
$\phi_1$=phase of present digit
$\phi_2$=phase of reference The solution of this integral is:

$$M(t)=K_1 \cos (\phi_2-\phi_1)$$

where $$K_1=\frac{K}{w_c}A_pA_r=1 \text{ (for simplicity)}$$

so that $$M(t)=\cos (\phi_2-\phi_1) \quad \text{(a)}$$

After the data has been transmitted over any conventional sort of transmission medium, it is received at the receiver of this invention shown in FIG. 2. The receiver bandpass filter 10 serves primarily to restrict the noise band entering the receiver. The filtered signal is then passed through a conventional automatic gain control (AGC) and amplifier module 11 before being operated upon by the detector of this invention. These components serve to maintain a constant level for a range of input levels.

The first step in the detection process employs a full wave rectifier 12 which inverts the sinusoidal waveform so that all undulations are in a single direction (either positive or negative). Next, a bandpass filter 13 operates to remove a harmonic of the main carrier waveform. Although other harmonics may be selected, the fourth harmonic is the strongest frequency component of the main carrier, and is therefore preferred. The frequency of this component is four times that of the main carrier.

This fourth harmonic is then broken down, or divided, into two out-of-phase signals termed "reference carriers" in digital divider 14. The phase relationship of these reference carriers is very important to this invention. The phase of one differs from that of the main carrier by an integral number of degrees, obtained from the following formula:

$$-135°+90n$$

where $n$ may be any integer from 0 to 3. In other words, the phase difference between the first reference carrier and the main carrier is either ±45° or ±135°. A digital divided is a conventional piece of apparatus for obtaining an output signal at one-fourth the frequency of the input signal. This output signal will be in phase with the extracted fourth harmonic of the carrier. To obtain the two reference carriers, one differing in phase from the extracted harmonic by +45° and the other by −45°, the output signal from the digital divider must be shifted by +45° and −45°. However, by modifications well known in the art to the digital divider circuitry itself, the two desired reference carriers in the proper phase relationships may be obtained directly without the ±45° shifting.

The second reference carrier will always differ in phase from the first by 90°. The apparatus, such as digital divider 14, producing the two reference carriers from the output of filter 13 will be adapted so that the second reference carrier will continuously bear the same relationship to the first carrier. In other words, the apparatus may be so designed that the second reference carrier always leads the first by 90°, or so that the second reference carrier always lags behind the first by 90°. The invention is operative with either relationship. The first reference carrier has a phase termed P and the second has a phase termed "Q," where $P=Q\pm90°$. In the illustrative embodiment, $P=Q-90°$ The reasons for the above phase relationships will be more easily understood after the description of the product modulators and RC integrators.

The two reference carriers of phases P and Q are passed to product modulators 15 and 16, respectively. These product modulators are conventional multipliers, such as diode multipliers, which multiply the amplified input signal from module 11 by each of the two reference carriers. If desired, the outputs from modulators 15 and 16 may be further amplified by amplifiers 17 and 18, respectively, to overcome any losses in the modulators.

The two binary signals from modulators 15 and 16 are what may be termed "analog" binary signals. This implies that their waveshapes are continuous, as opposed to the discrete wave shaping of digital binary signals. However, these analog binary signals are converted to digital binary signals by sampling techniques, performed by RC integrators 19 and 20. These integrators correlate and integrate the analog signals over a one-digit period. They are cleared and sensed at the end of each digit by a conventional synchronization recovery circuit 21. A clock rate equal to the transmission bit rate is recovered by such a circuit, which in turn provides clock pulses to integrators 19 and 20 at the rate of $C/2$ (one-half the original data bit rate at the input to the transmitters).

The use of RC integrators for the conversion from analog to digital waveforms is by no means the only possible alternative. For example, a low-pass filter followed by a binary slicer and decision flip-flop may equally well be employed. Various components, known in the art, for converting the binary analog signal from the modulators to a binary digital signal may be used without departing from the scope of the invention.

Considering the two binary signals emerging from integrators 19 and 20, the reasons for the selected phase relationships between the main carrier and the two reference carriers will now be understood.

Using the detector of this invention employing two modulators and two integrators, the input to the first is the present digit and first reference carrier, and the output is denoted by $M_1$. The input to the second is also the present digit and the first reference carrier shifted by 90°, and the output is denoted by $M_2$. Then by the Equation ($a$), $M(t)=\cos(\phi_2-\phi_1)$, given above:

$$M_1=\cos(\phi_2-\phi_1) \quad (b)$$

$$M_2=\cos(\phi_2-\phi_1+90°) \quad (c)$$

Table II lists the values of $M_1$ and $M_2$ for eight values of the angle $(\phi_2-\phi_1)$ according to expressions ($b$) and ($c$).

TABLE II

| $(\phi_2-\phi_1)$ degrees | $M_1$ | $M_2$ |
|---|---|---|
| 0 | 1 | 0 |
| 45 | $1/\sqrt{2}$ | $-1/\sqrt{2}$ |
| 90 | 0 | −1 |
| 135 | $-1/\sqrt{2}$ | $-1/\sqrt{2}$ |
| 180 | −1 | 0 |
| 225 | $-1/\sqrt{2}$ | $-1/\sqrt{2}$ |
| 270 | 0 | 1 |
| 315 | $-1/\sqrt{2}$ | $1/\sqrt{2}$ |

Examination of Table II reveals that phase differences $n\pi/2$ where $n=0, 1, 2,$ and 3 are not very useful, since they involve three possible values of $M_1$ and $M_2$. In practice, a "zero" voltage may well result in some positive or negative value, causing ambiguity in decoding the data. On the other hand, phase differences $n\pi/4$, where $n=1, 3, 5, 7$ involve clear-cut binary decisions and the voltage is either positive or negative so that no ambiguity is possible.

As a consequence, the system must provide phase differences between the main carrier and one reference carrier at the product demodulators which are ±45° or ±135° at the start of any digit period.

From Table II, $$\cos\pm 45°=+\frac{1}{\sqrt{2}}$$

$$\cos\pm 135°=-\frac{1}{\sqrt{2}}$$

For simplicity of notation, the following rule will be followed:

$$\cos\pm 45°=+\frac{1}{\sqrt{2}} \rightarrow \text{binary } 1$$

$$\cos\pm 135°=-\frac{1}{\sqrt{2}} \rightarrow \text{binary } 0$$

The phase of the extracted carrier itself, however, is ambiguous. It may be any one of the four phases: 45°, −45°, 135°, or −135°. Consequently, there are four distinct possibilities of the two reference carrier phases, namely:

TABLE III

| | P | Q |
|---|---|---|
| Case (1), 45° | 0° | 90° |
| Case (2), −45° | −90° | 0° |
| Case (3), 135° | 90° | 180° |
| Case (4), −135° | 180° | −90° |

Each of these four cases is equally likely (assuming random data) and each case must lead to one, and only one, result at the output of the detector in order for the original data to be unambiguously reconstructed. This will be demonstrated for each of the four cases later herein.

The binary digital signals emergent from integrators 19 and 20 are related to the original data, but are clearly not the original data streams A and B. Further decoding is necessary to retrieve from these two signals the original binary data.

Signals from integrators 19 and 20 are converted by decision flip-flops 22 and 23 into binary form. These squared binary pulses are then gated through AND-gates 24 and 25 synchronously with clock pulses at the pulse rate of $C/2$ from synchronization recovery circuit 21. Because these bits are at one-half the transmission rate, they are called "dibits." Thus, for each binary positive pulse, AND-gates 24 and 25 will provide a positive output pulse; for a binary negative pulse, they will provide no output pulse. The binary data emerging from AND-gate 24 has been termed F and the binary data from AND-gate 25, G. F and G represent the present binary bits from flip-flops 22 and 23, respectively. The binary data from AND-gate 24 is passed to the input of flip-flop 26, and the binary data from AND-gate 25 to the input of flip-flop 27.

Flip-flops 26 and 27 are considered one dibit delay flip-flops. These flip-flop circuits are conventional set and reset circuits, such as generally described, for example, by Millman and Taub in the publication "Pulse, Digital and Switching Waveforms," McGraw-Hill Book Co., 1965, on pages 345 and 346 and FIGURE 9–41, entitled "A Shift Register." These flip-flop circuits 26 and 27 receive the clock pulses $C/2$. In much the same manner as an amplifier is normally shown without connections to a power supply, the circuit of FIGURE 2 shows the flip-flop circuits 26 and 27 without connections to the clock pulses. Actually, each of the flip-flop circuits 26 and 27 incorporates not only set and reset portions, but, also, a very small time delay, normally provided by an R-C circuit, through which the indicated input is passed to the "set" portion. The clock pulse $C/2$ is applied to the "reset" portion in a conventional manner, as established, for example, by the above-cited reference. The very small delay is provided for the purpose of preventing coincidence between the indicated input and the clock pulse $C/2$ and is extremely small in comparison to the time interval between the dibit pulses emanating from the gates 24 and 25. It may be considered that this small delay is part of one stage of a shift register, or flip-flop, which will be seen to always be reset to the negative state, or binary zero, by the dibit clock. Thus, if there is no output from the AND circuit 24, for example, the flip-flop 26 will stay in the binary zero state until the next interval; however, if there is a positive output pulse from circuit 24, flip-flop 26 will be set to binary one after it had previously reset to binary zero. The output from flip-flop 26 actually represents the previous state of the output of flip-flop 22. AND gate 24 and flip-flop 26 operate as a one-bit delay register. The data emerging from flip-flop 26 is data F delayed by one dibit, and has been called D; the data from flip-flop 27 is data G delayed by one dibit, and has been called E. From binary data D, E, F, and G, and their inverted forms $\overline{D}$, $\overline{E}$, $\overline{F}$, and $\overline{G}$, obtained from inverters 28, 29, 30, and 31, respectively, original binary data streams A and B are unambiguously reconstructed.

It will now be shown that this unambiguous reconstruction is possible irrespective of which one of the four possible carrier phases has been recovered. Recalling that Table III, above, shows that there are four possibilities for P and Q, each case must be examined individually to prove that the same result will obtain. In the following Table IV, all four possibilities of the transmitted data pattern of a data sequence AB are examined. The first column shows these patterns repeated four times. An arbitrary phase change has been designated for each one of the four patterns. The previous dibit, before the phase change, may have been any one of four absolute phases i.e., 45°, −45°, 135°, or −135°. To cover each of these four cases, each data pattern has been repeated four times. The phase of the present dibit is obtained by adding the phase change to the phase of the previous dibit, as shown in Table IV.

dibits for the present phase are obtained in exactly the same manner. These computations have been carried out for all possible data patterns and phase changes for each of the four cases, with the results shown in Table IV.

The present dibits of the phase P reference carrier emerge from AND-gate 24 and thus provide binary dibits F, as shown in FIG. 2. The previous dibits of the phase P reference carrier emerge from flip-flop 26 and provide binary dibits D. Similarly, the present dibits of the phase Q reference carrier emerge from AND-gate 25, providing binary dibits G, and the previous dibits of the phase Q reference carrier come from flip-flop 27, providing binary dibits E.

From all of the above binary dibits D, E, F and G (and their inverted forms, of course, available through inverters 28–31), the transmitted data pattern shown in the first column of Table IV may be reconstructed. The correct transmitted pattern must result, irrespective of which one of the four possible carrier phases happens to be selected.

In this regard, note from the first column of Table IV that $A=1$ in the rows 9–16, and that $B=1$ in rows 5–8 and 13–16. Expressing A and B in Boolean canonical form in terms of D, E, F, and G for the first case ($P=0°$; $Q=90°$):

$$A=DE\overline{F}G+D\overline{E}FG+\overline{D}E\overline{F}\overline{G}+\overline{D}\overline{E}F\overline{G}+DE\overline{F}\overline{G}+D\overline{E}\overline{F}G+\overline{D}EF\overline{G}+\overline{D}\overline{E}FG \quad (1)$$

$$B=DEF\overline{G}+D\overline{E}\overline{F}\overline{G}+\overline{D}EFG+\overline{D}\overline{E}\overline{F}G+DE\overline{F}\overline{G}+D\overline{E}\overline{F}G+\overline{D}EF\overline{G}+\overline{D}\overline{E}FG \quad (2)$$

In other words, when any of the eight binary conditions shown in Equation 1 is present, $A=1$; similarly, when

TABLE IV

| Transmitted Data Pattern | | Phase Change in Degrees | Previous Dibit Absolute Phase in Degrees | Present Dibit Absolute Phase in Degrees | Previous and Present Dibit Detector Outputs | | | | | | | | | | | | | | | |
|---|---|---|---|---|---|---|---|---|---|---|---|---|---|---|---|---|---|---|---|---|
| | | | | | Case (1) P=0°; Q=90° | | | | Case (2) P=−90°; Q=0° | | | | Case (3) P=90°; Q=180° | | | Case (4) P=180°; Q=−90° | | | | |
| Row | AB | | | | D | E | F | G | D | E | F | G | D | E | F | G | D | E | F | G |
| 1 | 00 | 0 | 45 | 45 | 1 | 1 | 1 | 1 | 0 | 1 | 0 | 1 | 1 | 0 | 1 | 0 | 0 | 0 | 0 | 0 |
| 2 | 00 | 0 | −45 | −45 | 1 | 0 | 1 | 0 | 1 | 1 | 1 | 1 | 0 | 0 | 0 | 0 | 0 | 1 | 0 | 1 |
| 3 | 00 | 0 | 135 | 135 | 0 | 1 | 0 | 1 | 0 | 0 | 0 | 0 | 1 | 1 | 1 | 1 | 1 | 0 | 1 | 0 |
| 4 | 00 | 0 | −135 | −135 | 0 | 0 | 0 | 0 | 1 | 0 | 1 | 0 | 0 | 1 | 0 | 1 | 1 | 1 | 1 | 1 |
| 5 | 01 | −90 | 45 | −45 | 1 | 1 | 1 | 0 | 0 | 1 | 1 | 1 | 1 | 0 | 0 | 0 | 0 | 0 | 0 | 1 |
| 6 | 01 | −90 | −45 | −135 | 1 | 0 | 0 | 0 | 1 | 1 | 1 | 0 | 0 | 0 | 0 | 1 | 0 | 1 | 1 | 1 |
| 7 | 01 | −90 | 135 | 45 | 0 | 1 | 1 | 1 | 0 | 0 | 0 | 1 | 1 | 1 | 1 | 0 | 1 | 0 | 0 | 0 |
| 8 | 01 | −90 | −135 | 135 | 0 | 0 | 0 | 1 | 1 | 0 | 0 | 0 | 0 | 1 | 1 | 1 | 1 | 1 | 1 | 0 |
| 9 | 10 | 90 | 45 | 135 | 1 | 1 | 0 | 1 | 0 | 1 | 0 | 0 | 1 | 0 | 1 | 1 | 0 | 0 | 1 | 0 |
| 10 | 10 | 90 | −45 | 45 | 1 | 0 | 1 | 1 | 1 | 1 | 0 | 1 | 0 | 0 | 1 | 0 | 0 | 1 | 0 | 0 |
| 11 | 10 | 90 | 135 | −135 | 0 | 1 | 0 | 0 | 0 | 0 | 1 | 0 | 1 | 1 | 0 | 1 | 1 | 0 | 1 | 1 |
| 12 | 10 | 90 | −135 | −45 | 0 | 0 | 1 | 0 | 1 | 0 | 1 | 1 | 0 | 1 | 0 | 0 | 1 | 1 | 0 | 1 |
| 13 | 11 | 180 | 45 | −135 | 1 | 1 | 0 | 0 | 0 | 1 | 1 | 0 | 1 | 0 | 0 | 1 | 0 | 0 | 1 | 1 |
| 14 | 11 | 180 | −45 | 135 | 1 | 0 | 0 | 1 | 1 | 1 | 0 | 0 | 0 | 0 | 1 | 1 | 0 | 1 | 1 | 0 |
| 15 | 11 | 180 | 135 | −45 | 0 | 1 | 1 | 0 | 0 | 0 | 1 | 1 | 1 | 1 | 0 | 0 | 1 | 0 | 0 | 1 |
| 16 | 11 | 180 | −135 | 45 | 0 | 0 | 1 | 1 | 1 | 0 | 0 | 1 | 0 | 1 | 1 | 0 | 1 | 1 | 0 | 0 |

The last eight columns of Table IV show the previous and present dibit detector outputs for each of the four cases shown in Table III. Column D is the previous dibit of phase P; column E is the previous dibit of phase Q; column F is the present dibit of phase P; and Column G is the present dibit of phase Q.

To obtain the proper binary dibit for column D, for example (the previous dibit of phase P), the phase of P in degrees (0° in case 1) is subtracted from the absolute phase of the previous dibit in degrees. The result, which is always equivalent to ±45° or ±135°, is then assigned its proper binary dibit (recalling that ±45° is binary 1 and ±135° is binary 0). The resultant binary dibit appears in column D. In case 1, the calculation for the first row would be: 45°−0°=45°, or binary 1. In the same way, the previous dibit of phase Q in case 1 is obtained by subtracting 90° (Q in case 1) from 45° to yield −45°, or binary 1 for column E in the first row. The proper any of the eight binary conditions shown in Equation 2 is present, $B=1$. When none of the Equation 1 conditions are present, $A=0$; when none of the Equation 2 conditions are present, $B=0$.

The expressions for A and B can easily be derived in exactly the same manner for the remaining three cases shown in Tables III and IV. It will be seen that the same expressions obtained for A and B as shown in Equations 1 and 2, respectively, proving that the original transmitted binary data pattern can be unambiguously reconstructed irrespective of the chosen phase of the reference carriers.

By well known Boolean simplification (such as by use of a Karnaugh map), the above expressions for A and B can be converted to the following:

$$A=E\overline{F}\overline{G}+D\overline{F}G+\overline{E}FG+\overline{D}F\overline{G}$$
$$B=D\overline{F}\overline{G}+\overline{E}\overline{F}G+\overline{D}FG+EF\overline{G}$$

The first term on the right of Equation 3 is derived in AND-gate 32 of FIG. 2; the second term in AND-gate 33; the third in AND-gate 34; and the fourth in AND-gate 35. These four terms are combined, as in Equation 3, in OR-gate 36, thus logically forming the term A.

In exactly the same way, the term B from Equation 4 is formed using AND-gates 37, 38, 39, and 40, and OR-gate 41, as shown in FIG. 2. The parallel data dibits A and B are conventionally converted into serial form to obtain interleaved binary data-bits AB in 2-stage shift register 42, synchronized by clock pulses at the transmission rate C from synchronization recovery circuit 21. The AND-gates 32–35 and 37–40 are synchronized by the same circuit at the pulse rate of $C/2$. The data rate through these gates is half the transmission rate C, it is recalled, because the data through these gates is in dibits. The data finally emerging from shift register 42 corresponds exactly to the data fed to AND-gate 1 of the transmitter of FIG. 1.

The logic circuitry used in the embodiment of FIG. 2 is obviously subject to change. The logic could be designed to produce unsimplified expressions for A and B, or the many alternative equivalent simplified Boolean expressions. However, it has been theoretically demonstrated above, and experimentally proved that the implementation of Equations 1 and 2, or their Boolean equivalents, product the correct data at the output irrespective of the carrier phase employed by the detector.

Moreover, many other modifications may be made in the apparatus illustrated and specifically described without departing from the spirit and scope of the invention. Therefore, the only limitations to be placed on that scope are those expressed in the claims which follow.

What is claimed is:

1. Apparatus for recovering the original binary data from a carrier which has been quaternary phase-modulated with said data, which apparatus comprises:

(a) means for obtaining a frequency component of said carrier from the said phase-modulated carrier;

(b) means for converting said component into two reference carriers, each of the same frequency as said carrier, the first of which differs in phase from the carrier by an integral number of degrees obtained from the following formula:

$$-135°\pm 90n$$

where $n$ may be any integer from 0 to 3, and the second of which is 90° out-of-phase with the first;

(c) means for separately multiplying each of said reference carriers by said quaternary phase-modulated carrier to obtain two binary analog signals;

(d) means for converting each of said two binary analog signals to corresponding first and second binary digital signals, respectively;

(e) means for delaying each of said two binary digital signals by one binary bit to obtain third and fourth binary digital signals; and (f) means for logically combining said first, second, third, and fourth binary digital signals to produce a binary output signal corresponding to said original binary data.

2. The apparatus of claim 1 where said first binary digital signal is represented by the symbols F and $\bar{F}$, said second binary digital signal by the symbols G and $\bar{G}$, said third binary digital signal by the symbols D and $\bar{D}$, and said fourth binary digital signal by the symbols E and $\bar{E}$, further defined by said means for logically combining said digital signals combining them to achieve the following logical combination:

$$A=DE\bar{F}G+D\bar{E}FG+\bar{D}E\bar{F}\bar{G}+\bar{D}\bar{E}F\bar{G}+DE\bar{F}\bar{G}+D\bar{E}\bar{F}G+\bar{D}EF\bar{G}+\bar{D}\bar{E}FG$$

$$B=DEF\bar{G}+D\bar{E}\bar{F}\bar{G}+\bar{D}EFG+\bar{D}\bar{E}\bar{F}G+DE\bar{F}\bar{G}+D\bar{E}\bar{F}G+\bar{D}EF\bar{G}+\bar{D}\bar{E}FG$$

wherein A and B are two binary data streams interleaved to form the transmitted binary data.

3. The apparatus of claim 2 further defined by the addition of means for interleaving binary data streams A and B to form a continuous binary data stream equivalent to the original data transmitted.

4. Apparatus for recovering the original binary data from a carrier which has been quaternary phase-modulated with said data, which apparatus comprises:

(a) means for filtering a frequency component of said carrier from said phase-modulated carrier;

(b) means including a digital divider for converting said component into two reference carriers, each of the same frequency as said carrier, the first of which differs in phase from the carrier by an integral number of degrees obtained from the following formula:

$$-135°\pm 90n$$

where $n$ may be any integer from 0 to 3, and the second of which is 90° out-of-phase with the first;

(c) a product modulator for separately multipling each of said reference carriers by said quaternary phase-modulated carrier to obtain two binary analog signals;

(d) means including an RC integrator for converting each of said two binary analog signals to corresponding first and second binary digital signals, respectively;

(e) means for delaying each of said two binary digital signals by one binary bit to obtain third and fourth binary digital signals; and (f) means for logically combining said first, second, third, and fourth binary digital signals to produce a binary output signal corresponding to said original binary data.

5. The apparatus of claim 4, where said first binary digital signal is represented by the symbols F and $\bar{F}$, said second binary digital signal by the symbols G and $\bar{G}$, said third binary digital signal by the symbols D and $\bar{D}$, and said fourth binary digital signal by the symbols E and $\bar{E}$, further defined by said means for logically combining said digital signals combining them to achieve the following logical combination:

$$A=DE\bar{F}G+D\bar{E}FG+\bar{D}E\bar{F}\bar{G}+\bar{D}\bar{E}F\bar{G}+DE\bar{F}\bar{G}+D\bar{E}\bar{F}G+\bar{D}EF\bar{G}+\bar{D}\bar{E}FG$$

$$B=DEF\bar{G}+D\bar{E}\bar{F}\bar{G}+\bar{D}EFG+\bar{D}\bar{E}\bar{F}G+DE\bar{F}\bar{G}+D\bar{E}\bar{F}G+\bar{D}EF\bar{G}+\bar{D}\bar{E}FG$$

wherein A and B are two binary data streams interleaved to form the transmitted binary data.

6. The apparatus of calim 5 further defined by the addition of means for interleaving binary data streams A and B to form a continuous binary data stream equivalent to the original data transmitted.

7. The apparatus of claim 5 further defined by said means for logically combining said digital signals including a plurality of AND-gates, a plurality of OR-gates, and a plurality of inverters.

8. The method for recovering the original binary data from a carrier which has been quaternary phase-modulated with said data, which method comprises:

(a) obtaining a frequency component of said carrier from said phase-modulated carrier;

(b) converting said component into two reference carriers, each of the same frequency as said carrier, the first of which differs in phase from the carrier by an integral number of degrees obtained from the following formula:

$$-135°\pm 90n$$

where $n$ may be any integer from 0 to 3, and the second of which is 90° out-of-phase with the first;

(c) separately multiplying each of said reference carriers by said quaternary phase-modulated carrier to obtain two binary analog signals;

(d) converting each of said two binary analog signals to corresponding first and second binary digital signals, respectively;

(e) delaying each of said two binary digital signals by one binary bit to obtain third and fourth binary digital signals; and (f) logically combining said first, second, third, and fourth binary digital signals to produce a binary output signal corresponding to said original binary data.

References Cited

UNITED STATES PATENTS

| | | | |
|---|---|---|---|
| 2,984,701 | 5/1961 | Barry | 178—66 |
| 3,242,262 | 3/1966 | Melas et al. | 178—66 |

ROBERT L. GRIFFIN, *Primary Examiner.*

W. S. FROMMER, *Assistant Examiner.*